United States Patent [19]

De Belder et al.

[11] 3,726,034

[45] Apr. 10, 1973

[54] X-RAY IMAGE VIEWER

[75] Inventors: Maurice Hector De Belder, Mechelen; Romain Henri Bollen, Hove; Emile Frans Stievenart, Hoboken; Albert Frans Thiels, Mortsel, all of Belgium

[73] Assignee: Gevaert-AGFA, N.V. Mortsel, Belgium

[22] Filed: Jan. 12, 1971

[21] Appl. No.: 105,810

[30] Foreign Application Priority Data

Jan. 12, 1970 Belgium.....................1470

[52] U.S. Cl.........................40/106.1, 350/317
[51] Int. Cl.........................G09f 13/10
[58] Field of Search............40/106.1; 350/314, 350/317

[56] References Cited

UNITED STATES PATENTS 3,536,402  10/1970  Aston...........................350/314 X
2,285,262  6/1942   Fess et al......................350/315 X
2,567,561  9/1951   Hoffmann......................40/106.1 X
3,520,626  7/1970   Hach..............................350/314 X

*Primary Examiner*—Robert W. Michell
*Assistant Examiner*—Richard Carter
*Attorney*—William J. Daniel

[57] ABSTRACT

A light-projecting system for projecting light through a transparent colored image. The system comprises a light source or light sources from which light is directed through at least a portion of said image, and filters which can be progressively exposed in the path of light travelling to at least said portion of said image. The filters have light absorption characteristics such that said progressive filter exposure results in a progressive increase in the amount of irradiating light which lies in that part of the visible spectrum which is complementary of that part of such spectrum containing the wavelengths in the said same image color.

4 Claims, 6 Drawing Figures

X-RAY IMAGE VIEWER

This invention relates to light projection systems for use in recording or viewing transparent colored photographic and radiographic images.

If a said transparent image consists of or includes juxtaposed areas of the same color but different color density, the image details represented by the color density different are sometimes insufficiently clear when the image is recorded or viewed by means of transmitted light.

It is an object of the invention to provide for modification of the visual contrast of such images.

According to the present invention, a light projecting system is used for projecting light through a transparent colored image having at least one part which comprises juxtaposed areas of the same image color but different color density, such system comprising a light source or light sources from which light is directed through at least said one part of said image, and a filter or filters which can be progressively exposed in the path of light travelling to at least said one part of said image, said filter or filters having light absorption characteristics such that the said progressive filter exposure results in a progressive increase in the amount of irradiating light which lies in that part or parts of the visible spectrum which is or are complementary to that part or parts of such spectrum containing the wavelengths or the predominating wavelengths in the said same image color.

In the foregoing definition, the term "image color" means the color of the light transmitted by the image or Image part in question when it is irradiated with white light, and the term "irradiating light" means the light incident upon the specified image or image part.

When the irradiating light is light transmitted through the said filter or filters, the visual contrast of the irradiated image is improved, particularly in the case of low density areas. The said filter or filters is or are hereafter referred to as the "contrast filter(s)".

In order to permit the visual contrast to be increased to an appreciable extent it is preferred to employ a contrast filter or filters of such light absorption characteristics that at one end of the variability range the composition of the irradiating light is at least mainly in the said complementary part or parts of the visible spectrum. Optimally, at that end of the variability range the composition of the irradiating light is entirely or substantially entirely in such complementary part or parts of the spectrum. In order to achieve a wide contrast variability range it is preferred to design the system so that at the other end of the variability range the amount of irradiating light which lies in said complementary part or parts of the visible spectrum is nil or substantially so, or at least is less than the amount of irradiating light which is in the other part or parts of the visible spectrum. Depending on the spectral composition of the light emitted by the light source or sources this may be achieved by using unfiltered light as the irradiating light when and to the extent that the contrast filter or filters is or are not effectively exposed, or by influencing the spectral composition of the irradiating light at such times by means of a filter or filters of appropriately different absorption characteristics from the contrast filter or filters. By way of example, when using "white" light sources in a system for viewing a blue-cyan monochrome image, one or more orange-red filters may be used as contrast filter(s) and when and to the extent that such contrast filter(s) is or are not effectively exposed in the path of light travelling to the image, the irradiating light may be left unfiltered or a neutral color filter may be used so that the irradiating light is white or neutral, or a blue-cyan filter may be used so that the irradiating light is substantially within the same spectral band or bands as the image color.

It is preferable for the illumination of the image or image part which is subject to visual contrast variation to be kept substantially constant during such variation. This may be achieved by employing a compensating filter or filters of a density matching the density of the contrast filter or filters, such compensating filter or filters being arranged so that the amount of light passing to the image through the contrast filter(s) is at all settings within the contrast variability range inversely proportional to the amount of light passing to the image through the compensating filter(s). Said compensating filter(s) may serve the dual purpose of keeping the illumination of the image substantially constant and of influencing the spectral composition of the irradiating light as above referred to for the purpose of achieving a wide contrast variability range.

The progressive exposure of the contrast filter or filters may be achieved by progressively displacing such filter(s) into the path of light travelling from the light source or light sources to the image or by progressively displacing an opaque mask or masks from masking position in relation to such filter(s).

The contrast filter or filters may be in the form of a coating or coatings on a transparent substrate. For example the said filter or filters may be provided by a coating or coatings on the envelope or envelopes of a lamp or lamps used as light source(s). In that case a displaceable mask or masks may be provided by movement of which light passing through the contrast filter(s) can be progressively intercepted and prevented from reaching the image.

Preferably however the contrast filter or filters is or are separate from the lamp or lamps.

It is very suitable to provide a plurality of contrast filters distributed over the cross-sectional area of the light beam emitted from the light source or sources towards the image, such filters being borne by a common carrier, to provide a plurality of masks which are distributed in a similar manner adjacent the contrast filter carrier, and to provide for relative displacement of said carriers over a variability range at one end of which the contrast filters register with the masks and the irradiating light is light which passes between the contrast filters and between the masks, and at the other end of which the contrast filters are in register with the spaces between the masks and are therefore fully effective. At intermediate relative positions of the filter and mask carriers the irradiating light is composed partly of light which has passed through the contrast filters and partly of light which has not passed through those filters. The contrast filters may be formed by coatings on a glass plate or other carrier.

According to the presently preferred embodiment, there is a plurality of contrast filters as aforesaid occupying a series of spaced strip-like areas on a common carrier and a corresponding series of similarly shaped masks and such filters and masks are oriented with their lengthwise dimension running obliquely with respect to the axes of a plurality of elongated light sources, e.g., tubular discharge lamps. Such a relative arrangement of the filters and lamps promotes the attainment of a uniform distribution of the irradiating light at the image plane.

According to a possible alternative filter and mask arrangement, the filters and masks are arranged in a checkerboard pattern on relatively displaceable carriers.

For the purposes primarily in view it is important for the control system to be designed so that the progressive variation in the spectral composition of the irradiating light can be instantly terminated at any point within the total variability range.

As the invention has been made primarily with a view to aiding the inspection of transparent monochrome or polychrome images, and particularly monochrome X-ray images, the invention will be hereinafter described more specifically in that context. It will be evident however that if a given modification of the spectral composition of the irradiating light improves the visual contrast of the image, the same modification will enable the image details to be recorded with improved contrast if the transmitted light is used for recording or copying the image on radiation-sensitive material.

In order to achieve a substantially homogeneous spectral composition of the irradiating light for all settings within the variability range it is desirable to interpose a light mixing device or devices between the light source or sources and the transparent image. For viewing transparent images by transmitted light it is preferred to use a light mixing device in the form of a diffusing screen. Preferably the apparatus employed includes means for holding a said transparent image against the diffusing screen.

The apparatus employed may be designed for illuminating the whole of an exposed and developed film or "plate" as conventionally used in medical radiography or for illuminating two or more such films or plates simultaneously. The contrast filter or filters can be effective over the whole of the viewing area or over only a limited zone within that area. In the latter case the visual contrast of any selected part of an image can be varied provided the film or plate is located with that part of the image in the variability zone. One or more shutters or masks may be provided for masking any part of an image which at any given time does not need to be inspected.

Depending on the extent of the viewing area over which the contrast variability is to be effective it may be desirable to provide a plurality of light sources in a plane substantially parallel with the viewing plate (the plane of the irradiated image). For illuminating a given viewing area substantially uniformly, the depth of the space occupied by the apparatus, measured from the viewing plane to the light sources, can then be small in comparison with the depth of space required if only one light source is used.

The invention includes apparatus suitable for use in viewing radiographic film images comprising a diffusing screen, a light source or light sources arranged for illuminating such screen substantially uniformly, and a filter or filters which can be progressively exposed in the path of light travelling to said screen, said filter or filters having light absorbing characteristics such that the said progressive filter exposure results in the spectral composition of light irradiating the said screen being progressively varied over a variability range at one end of which the irradiating light lies in that part or parts of the visible spectrum which is or are complementary to the part or parts of such spectrum containing the wavelengths or the predominating wavelengths forming the irradiating light at the other end of such range.

As applied to monochrome radiographic image viewing systems, the invention gives particularly good results in the case that the radiographic image is in the blue-cyan color range and the irradiating light can be varied over a range at one end of which the irradiating light is composed wholly or predominantly of wavelengths within the said range blue-cyan, e.g., is substantially the same color as the image or is of neutral color, and at the other end of which variability range the irradiating light is wholly or mainly composed of wavelengths in a band or bands of the spectrum complementary to the band or bands containing the wavelengths or the predominating wave-lengths in the said image color, for example at the said other end of the variability range, the irradiating light may be yellow or in the orange-red color range.

Various apparatus for carrying out the invention will now be described with reference to the accompanying diagrammatic drawings in which.

Figure 1:
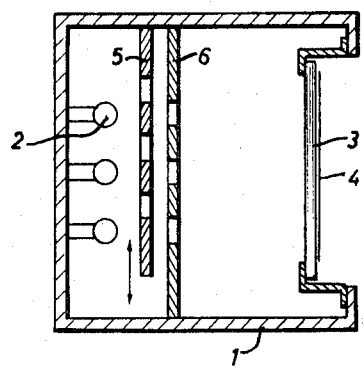
FIG. 1 is a cross-sectional elevation of one apparatus.

The apparatus according to FIG. 1 comprises a viewer housing 1 containing a set of tubular discharge lamps emitting white light, and a diffusing screen 3. The drawing shows only three lamps but in practice it is desirable to use more than three lamps arranged horizontally one above the other.

An X-ray film 4 bearing an X-ray image is held in position against the screen 3 by any suitable means such as a clip (not shown).

Figure 2:
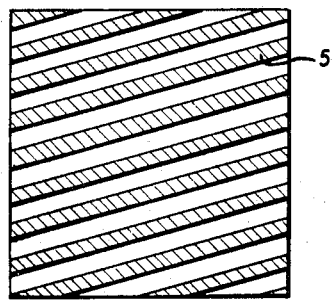
FIG. 2 is a front view of a contrast filter plate as used in the apparatus according to FIG. 1.

Between the light sources and the diffusing screen there is a filter plate 5 and a mask plate 6. The filter plate which is shown in front view in FIG. 2 comprises a series of obliquely disposed orange-red filter bands (shown hatched). These filter bands are formed by coatings on the plate, which is made of glass. The portions of the plate between the orange-red filter bands bear coatings forming grey filters of a density corresponding with the density of the orange-red filters. The filter plate is mounted in guides permitting vertical displacement of the filter plate as indicated by the arrows in FIG. 1. This displacement is effected by remote control means (not shown). It is very suitable for this displacement to be powered by an electric motor which can be switched on and instantaneously stopped at any moment by operation of a push button control accessible to the viewer.

The mask plate 6 is fixed and is provided with oblique strips of silver reflecting tape which intercepts light rays passings through the portions of the filter plate which are at any given time in optical register with such strips of tape.

When the filter plate is in the position illustrated in FIG. 1 the orange-red filters are in optical register with the clear areas of the mask plate and the irradiating light, i.e., the light which illuminates the X-ray film, is compressed substantially entirely of light in the orange-red band of the visible spectrum. This irradiating light is particularly effective for showing up the details in the low density areas of the X-ray image in the case that this is blue-cyan in color. As the filter plate is moved downwardly, unfiltered, i.e., white light, begins to reach the image and the proportion of white light increases as the downward movement continues. At the lower extremity of the filter plate movement light passing through the orange-red filters is substantially entirely intercepted by the silver tape masks on the mask plate 6. This white irradiating light is quite suitable for general image inspection and is in any way required for high density showing up the details in the ranges of the X-ray image. The latter inspection can also be carried out by means of blue-cyan irradiating light and to this end the orange-red filter bands on the filter plate may alternate with blue-cyan bands instead of with grey bands if so desired.

Inasmuch as the density of the grey filters corresponds with that of the orange-red band filters, the illumination of the diffusing screen remains substantially constant over the variability range. This avoids fatigue of the eye due to frequent adaptations to changing light intensity.

A cherckerboard pattern of filter and mask areas may be adopted instead of the oblique band pattern.

By way of modification, the apparatus could be provided with a fixed filter plate and a displaceable mask plate.

Figure 3:
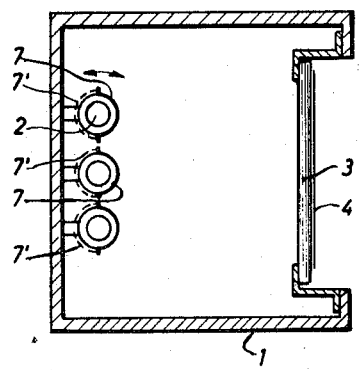
FIGS. 3 to 6 are cross-sectional views of part of three further apparatus according to the invention.

The apparatus shown in FIG. 3 employs an array of tubular discharge lamps 2, only three of which are shown, for illuminating the X-ray film 4 held against the diffusing screen 3. Each of the lamps is surrounded by filters 7, 7' extending around complementary halves of the lamp envelope. Filter 7 is orange-red and filter 7' is grey. The filters may be formed by coatings on the lamp envelopes in which case mechanism is provided for rotating the lamps about their axes through 180° so that either the orange-red or the grey filters can be progressively exposed in the path of the light rays which travel to the diffusing screen. As the proportion of orange-red in the irradiating light diminishes, so the proportion of neutral light transmitted through the grey filters increases and vice versa. Instead of coating the lamp envelopes the filters may be in the form of shells of semi-circular sectional profile which can be turned relative to the lamps.

If the filters are turned together in phase, the oblique rays reaching the top and bottom of the screen may be of different color composition. This may be avoided by arranging at least the filter associated with the top and bottom lamps to rotate out-of-phase.

Figure 4:
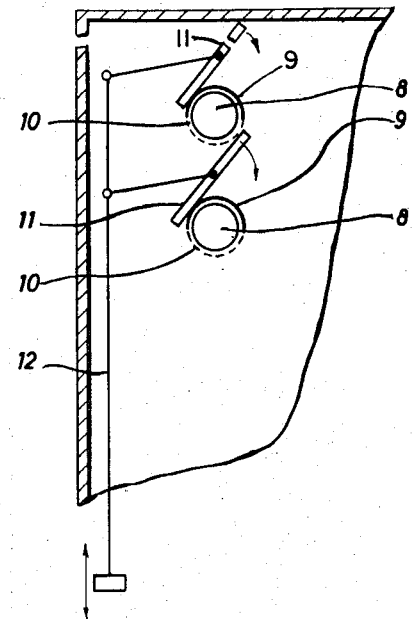

FIG. 4 shows part of an alternative system incorporating an array of lamps and associated pivotal mirrors. Only two of the lamps and two of the mirrors are shown in FIG. 4. The lamps 8 used in the FIG. 4 system are all the same and each lamp is surrounded by two filters. One of the filters, shown in full line and designated 9, is orange-red and covers the upper half of the lamp envelope and the other filter, shown in broken line and designated 10, is grey and covers the lower half of the lamp envelope. When the mirrors 11 are in their illustrated position the grey coated part of each lamp is masked by the mirror below it and all of the light reaching the diffusing screen is light transmitted through the orange-red filters. As the mirrors are pivoted clockwise by a remote control device 12 the grey filters become unmasked and as the pivotal movement of the mirrors continues the amount of light transmitted to the screen through the grey filters increases to a maximum and then the amount of orange-red light transmitted to the screen begins to decrease as the mirrors move into masking position over the orange-red filters. At the extremity of the mirror movement the orange-red filters are entirely masked and all of the light reaching the screen is light transmitted through the grey filters.

The filters 9, 10 can be members separate from but held against or close to the lamps, or they may be formed by coatings on the lamp envelopes.

In the FIG. 4 system the densities of the orange-red and the grey filters are such that the illumination of the diffusing screen remains substantially constant during movement of the mirrors over their full adjustment range.

The FIG. 4 system, like that shown in FIGS. 1 and 3, is primarily intended for viewing blue-cyan radiographic images.

Figure 5:
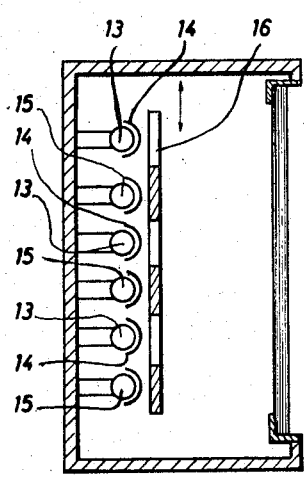

Referring now to FIG. 5, the system represented by this figure comprises an array of six light sources in the form of discharge lamps. Three of the lamps, designated 13, bear orange-red filter coatings 14 and the other three lamps 15 are uncoated. In front of the array of lamps there is a plate 16 which is slidable vertically as indicated by the arrows. This plate has alternate clear and opaque bands. In the illustrated position of the plate the transparent bands are in front of the orange-red light sources and the other light sources are masked by the opaque bands so that only light in the orange-red wavelength band reaches the diffusing screen. As the plate is moved vertically the orange-red light sources begin to be masked and the white light sources begin to be unmasked so that the proportion of orange-red light reaching the diffusing screen diminishes. At the limit of the upwardly movement of the plate 16 upward orange-red light sources are masked by the opaque bands of the plate and all of the light reaching the diffusing screen is unfiltered light emitted by the white light sources 15.

The illumination of the diffusing screen can be kept substantially constant over the variability range by means of photo-sensitive devices influencing the output of the lamps. Alternatively, the lamps 15 can be coated with grey filters of a density such that the amount of light emitted through the orange-red and the grey filters is the same. The amount of light reaching the diffusing screen from the sources 15 will be inversely proportional to the amount of light reaching the diffusing screen from the orange-red light sources in all intermediate positions of the plate 16.

Figure 6:
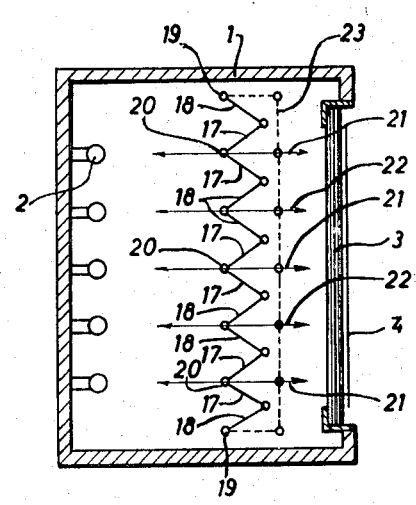

Reference is now made to FIG. 6. In this apparatus there are series of blue filter strips 17 and orange-red filter strips 18 forming a curtain between the lamps 2 and the diffusing screen 3 against which an X-ray film 4 bearing a blue-cyan image is supported. The filter strips are hingewise connected together so that they can articulate relative to each other about horizontal axes 20. The topmost and lowermost filter strips are hingeable about fixed axes 19. In the illustrated position of the filter curtain the irradiating light is light transmitted partly through the blue filters and partly through the orange-red filters. By means of a lever system including links 21, the hinge connections 20 can be pulled to the right to bring the blue filter strips 17 into the vertical plane 23. In that position of the curtain, the orange-red filter strips 18 lie in horizontal planes with neighboring strips 18 one on top of the other and the irradiating light is light entirely transmitted through the blue filters. As the blue filters move into fully operative position the contrast of the image decreases, which may be useful for inspecting details in the denser image parts. By means of another lever system including links 22, the hinge connections between the orange-red filter strips can be pulled to the right from their illustrated position to bring the orange-red filter strips 18 into the vertical plane 23 in which case the blue filter strips move into the inoperative horizontal position. Instead of providing the second lever system including the links 22 the lever system comprising the links 21 may be displaceable for moving the hinge connections 20 to the left from their illustrated positions. In that way the orange-red filter strips can be brought into a vertical plane between plane 23 and the lamps 2.

The densities of the blue and orange-red filters may correspond, so that the illumination of the diffusing screen remains constant over the variability range.

While the viewing of monochrome images has been more particularly referred to, it will be apparent that the invention can be usefully applied in systems for viewing polychrome images. By providing light sources emitting irradiating light in different spectral bands complementary to those of the different image colors and enabling such different light sources to be used independently, the contrast within image areas of any given color can be enhanced at will by switching to the appropriate color of irradiating light.

We claim:

1. Viewer for a colored x-ray image having a predominant wavelength, containing juxtaposed areas having the same color but different color densities, said viewer comprising a light source, a diffusing screen, and mounted between said light source and said screen for relative movement with respect to one another a grid having alternating opaque and transparent sections and a filter having in corresponding alternating first sections which substantially transmit light in that region of the visible spectrum which is complementary to the region of such spectrum containing the predominant wavelengths of said same image color and second sections which uniformly absorb a portion of the light over substantially the full visible spectrum, the optical density of said filter sections second being such that the intensity of the illumination impinging on said juxtaposed image areas remains substantially constant and independent of relative movement of said grid and filter.

2. Viewer according to claim 1, wherein said alternate first filter sections which substantially transmit light are orange-red filter sections.

3. A viewing box according to claim 2, wherein said alternate second filter sections which uniformly absorb light are gray filters.

4. A viewing box according to claim 1, wherein the light source is formed by a plurality of elongated light tubes mounted parallel to each other in a generally common plane, and wherein the alternating sections of the filter and the grid are likewise elongated, the longitudinal direction of said sections extending at a small angle with respect to the longitudinal direction of said light tubes.

* * * * *